Oct. 23, 1951    J. J. DILKS    2,572,602
PICTURE VIEWING DEVICE
Filed May 3, 1946
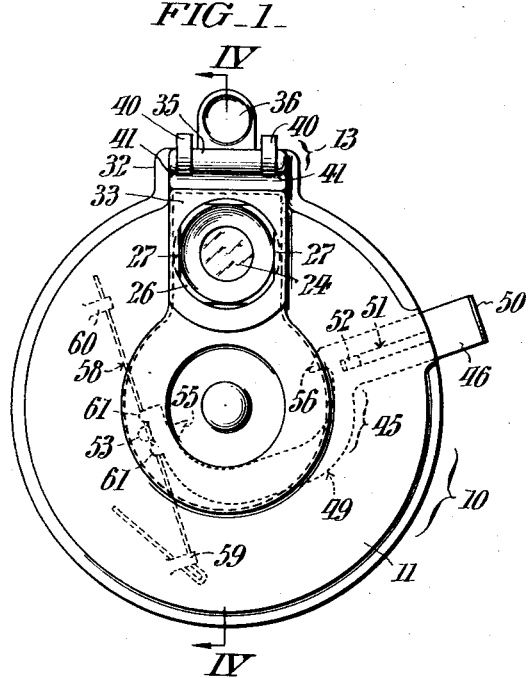
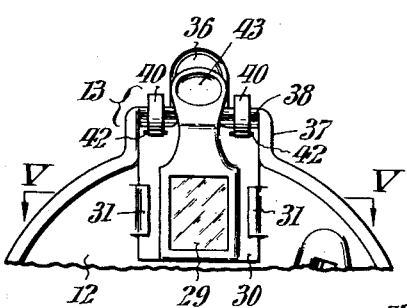
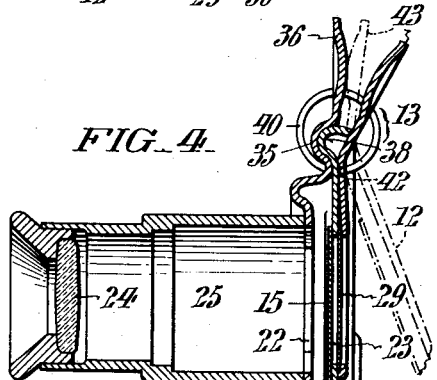
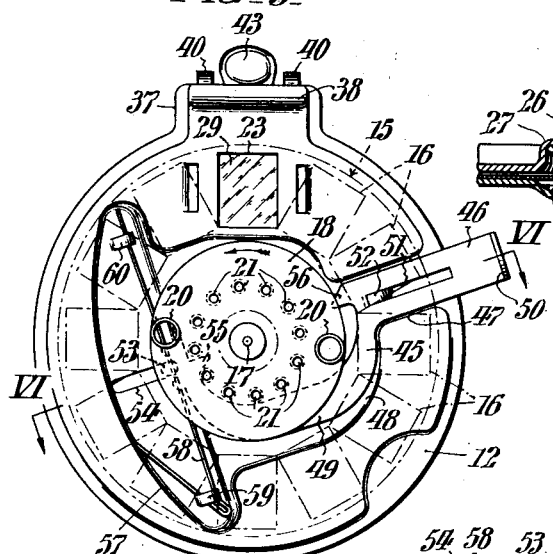
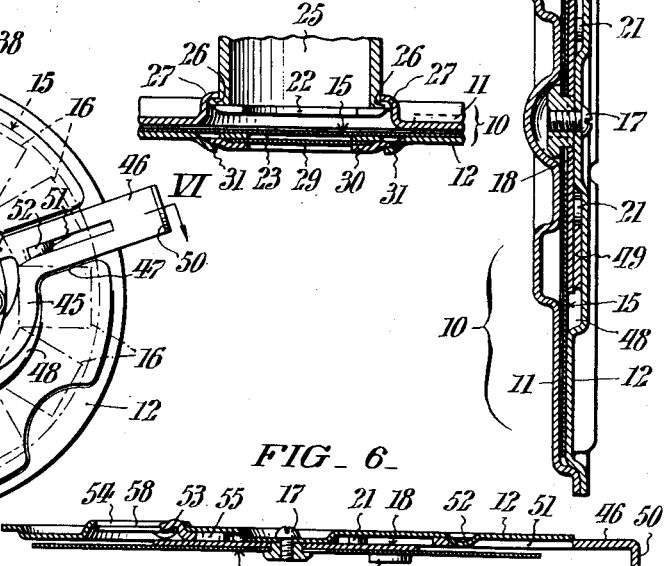
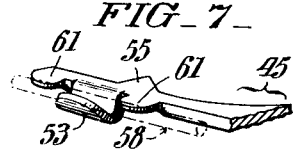
INVENTOR:
James J. Dilks,
BY Paul & Paul
ATTORNEYS.

Patented Oct. 23, 1951

2,572,602

UNITED STATES PATENT OFFICE 2,572,602,

PICTURE VIEWING DEVICE

James J. Dilks, Haddon Heights, N. J.

Application May 3, 1946, Serial No. 667,065

5 Claims. (Cl. 40—71)

This invention relates to picture viewing devices. More specifically, it is concerned with devices by the aid of which transparent pictures circumferentially arranged on interchangeable film disks can be individually viewed in succession through a shrouded lens aperture.

The chief aim of my invention is to provide a device of the kind referred to which is compact and rugged; which lends itself readily to economic manufacture in quantity; which incorporates simple and reliable mechanism for intermittently rotating the disks for presentation of the pictures successively to the lens aperture for viewing; and which is so constructed and arranged as to permit easy and quick interchange of disks with different picture subjects.

How the foregoing object and other attendant advantages may be readily realized in practice will appear from the following detailed description of the attached drawings, wherein Fig. 1 shows the front elevation of a picture viewing device conveniently embodying my invention.

Fig. 2 is a fragmentary view of the device in rear elevation.

Fig. 3 is a face view of the device with its front or cover component removed.

Fig. 4 shows the device in vertical section, the section being taken as indicated by the angled arrows IV—IV in Fig. 1.

Fig. 5 is a fragmentary detail view in cross section taken as indicated by the angled arrows V—V in Fig. 2.

Fig. 6 is a cross sectional view taken as indicated by the angled arrows VI—VI in Fig. 3; and Fig. 7 is a fragmentary perspective view of the operating element or actuator of the device.

As herein illustrated, my improved picture viewing device is characterized by having a casing 10 which is formed by two relatively-flat complemental annular components 11 and 12, these being connected at the top by a hinge means at 13 so as to be angularly separable for interchange of disks of Celluloid or the like, such as the one indicated at 15, carrying a circumferentially-arranged series of transparent pictures 16. Although shown as being fashioned as die stampings from sheet material, the casing components may, if found more desirable or convenient, be formed as plastic moldings. Rotatively supported by a fixed headed stud 17 at the center of the back component 12 is a circular mounting plate 18 for picture disks of glass or Celluloid such as the one indicated at 15 provided with a pair of diametral apertures to fit correspondingly-disposed forwardly extending lug projections 20 of said plate, as well as with an annular series of rearward studs 21 corresponding in number with annularly-arranged pictures on said disk for a purpose later explained. As shown, the lug projections 20 and the studs 21 result from spot punching and offsetting the material of the plate. By means hereinafter described, the mounting plate 18 is intermittently rotated for presentation of the pictures 16 of the disk 15 successively at registering viewing apertures 22 and 23 respectively in the front and rear casing components 11 and 12. From the component 11 projects forwardly in line with the aperture 22, a tubular shroud or barrel 25 with a magnifying lens 24 removably fitted into its outer end. The shroud tube or lens barrel 25 is held in place through overlapping of a truncated circumferential flange 26 at its inner end by offset marginal portions 27 of a receiving opening (Figs. 1 and 5) in the front casing component 11. Extending across the viewing aperture 23 in the rear casing component 12, which aperture is rectangular in shape and corresponds in size substantially to the pictures on the disk 15, is a translucent diaphragm 29 of glass or of Celluloid, the same being backed by a small frame piece 30 which is secured in position through overlap of its side edges by tongues 31 punched out of or displaced from the material of said rear casing component.

At the top, the front casing component 11 has a square cornered projection 32 in continuation of a straight sided radial embossment 33 in which the lens barrel 25 is anchored. As shown the projection 32 is formed with a hollow transverse bead 35 along its top edge and with a narrower finger press tab 36 thereabove. The rear casing component likewise has a square cornered radial projection 37 with a hollow transverse bead 38 that fits into the hollow of the bead 35 on the front casing component 11 to cooperate therewith in serving as the axis of the hinge means 13 hereinbefore referred to. Sprung over the edge beads 35 and 38 of the projections 32 and 37 at opposite sides of the finger press tab 36 are split spring bands 40. The ends of these bands respectively engage in a groove 41 immediately below the bead 35 of the front component 11 and in slots 42 adjacent the top edge of the frame piece 30 on the rear casing component 11 and so operate to yieldingly keep the two casing components in closed relation as shown in Fig. 4. Opening of the casing is effected by pressing an angularly displaced finger tab 43 at the top of the window piece 30 toward the finger tab 36 on the front component 11 with the result that the rear component will be swung away from said front component as indicated in dot-and-dash lines in Fig. 4.

The means provided for intermittently rotating the disk mounting 18 includes an actuator in the form of a thrust bar 45 which like the other part of the device is struck from sheet material and which lies immediately behind said mounting. As shown the actuator 45 has a straight end portion 46 which is confined in a radial slot depression 47 in the rear casing component 12 extending outward from a recess 48 occupied by the disk mounting plate 18, and an under slung portion 49 which underreaches and extends inward beyond the axis stud 17. The straight portion 46 of the actuator 45 protrudes beyond the casing and its outer end is laterally bent as at 50 for the purpose of a thumb press. In order to more accurately guide the actuator 45 to linear movement diametrically of the casing, it is formed in its straight portion with a longitudinal slot 51 which engages a projection 52 on the rear casing component 12, and at its opposite end with a laterally displaced tab 53 which engages an aligned radial slot 54 in said rear casing component. Within the bight of its under-slung portion 49, the actuator 45 is moreover provided with oppositely-arranged and oppositely beveled cam projections 55 and 56 for cooperation with the studs 21 on the disk mounting 18. Disposed in a lobular depression 57 in the rear casing component 12 at right angles to the line of thrust of the actuator 45 and continuous with but somewhat deeper than the central depression 48 is a finger bow spring 58 whereof one end is retroverted and anchored in a lug 59 on said component, its other end being slidingly confined in another lug 60 on said casing component. At its center, the spring 58 is engaged in the interval between the tab 53 and a pair of adjacent opposing clinch tabs 61 at the inner end of the actuator 45.

In use, the device is held upright, and the pictures on the film disk 15 are viewed through the lens 24 toward the light. Shifting of the disk 15 for presentation of a new picture at the viewing apertures 22 and 23 is effected simply by press and release of the actuator 45 which may be accomplished with the thumb or a finger of one hand. As the actuator 45 moves inward, the cam projection 56 thereon engages that stud 21 of the mounting plate 18 which lies in its path with the result that said plate is rotatively shifted in the direction of the arrow in Fig. 3 through half the extent actually required. The full rotation shift of the mounting disk 18 is completed upon release and outward movement of the actuator under the influence of the spring 58, when the cam lug 55 reacts with the stud 21 of said mounting plate then directly in its path. Thus by repeated pressing and releasing of the actuator 45, the pictures on the film disk are successively presented for individual viewing through the lens 24.

The film disk 15 can be readily removed from its mounting and another substituted therefor upon opening of the casing by pressing the two finger tabs 36 and 43 toward each other, which will cause the casing components 11 and 12 to pivot at their hinge connection 13 and separate to the extent indicated in broken lines in Fig. 4 as previously pointed out herein.

By reason of their unique construction, it will be apparent from the foregoing that the constituent parts can be economically produced in quantity, and moreover, that they can be quickly and easily assembled without necessitating the employment of specially skilled help or the use of any special tools.

Having thus described my invention, I claim:

1. A picture viewing device of the character described comprising a hollow casing having a disk with annularly-arranged pictures mounted therein, means for intermittently shifting the disk rotatively for presentation of its pictures successively at registering viewing apertures respectively in the front and rear walls of the casing, said means including a rotary mounting for the disk provided with an annular series of lateral studs corresponding in number to the pictures, and an actuating element accessible for manipulation at the edge of the housing confined to movement diametrically thereof, and having cam edges, one adapted upon movement of said element in one direction to cooperate with a stud on the plate and another adapted upon reverse movement of said element to cooperate with a diametrically opposite stud on said mounting to rotatively shift the film disk through a distance equal to the circumferential spacing of the pictures at each actuation.

2. The invention according to claim 1, wherein the casing is formed by two separable components; wherein one of the casing components carries the disk mounting and is recessed to accommodate the actuating element behind the plate and to guide said element in its movements.

3. The invention according to claim 1, wherein the casing is formed by two separable components; wherein one of the casing components carries the disk mounting and is recessed to accommodate the actuating element behind the mounting and to guide said element in its movements; wherein the casing components are fashioned from stiff sheet material; and wherein the disk mounting is fashioned from like material with spot embossments constituting the stud projections.

4. A picture viewing device according to claim 1, wherein the actuating element extends inward through a guide slot at the edge of the casing to a point beyond the axis of the disk mounting; and wherein a biasing bow spring within the casing and lying at right angles to the line of movement of the actuating element is engaged intermediate its ends by the inner end of said element.

5. A picture viewing device according to claim 1, wherein the actuating element extends inward through a guide slot at the edge of the casing to a point beyond the axis of the disk mounting; wherein a biasing bow spring within the casing and lying at right angles to the line of movement of the actuating element is engaged intermediate its ends by the inner end of said actuating element; and wherein said actuating element is struck from stiff sheet material formed at its inner end with opposing clinch tabs to embrace the bow spring.

JAMES J. DILKS.

REFERENCES CITED

The following references are of record in the file of this patent:

UNITED STATES PATENTS

| Number | Name | Date |
|---|---|---|
| 478,363 | Reed | July 5, 1892 |
| 721,313 | Lawless | Feb. 24, 1903 |
| 873,696 | Anderson | Dec. 10, 1907 |
| 1,623,026 | Cabezola | Mar. 29, 1927 |
| 1,714,159 | Crawford | May 21, 1929 |
| 2,189,285 | Gruber | Feb. 6, 1940 |

FOREIGN PATENTS

| Number | Country | Date |
|---|---|---|
| 438 | Great Britain | Jan. 8, 1892 |
| 527,555 | France | July 28, 1921 |